United States Patent
Chuang et al.

(10) Patent No.: US 9,924,181 B2
(45) Date of Patent: Mar. 20, 2018

(54) METHOD AND APPARATUS OF BI-DIRECTIONAL PREDICTION FOR SCALABLE VIDEO CODING

(71) Applicant: HFI Innovation Inc., Zhubei, Hsinchu County (TW)

(72) Inventors: Tzu-Der Chuang, Hsinchu County (TW); Yu-Wen Huang, Taipei (TW); Ching-Yeh Chen, Taipei (TW); Chia-Yang Tsai, New Taipei (TW); Chih-Ming Fu, Hsinchu (TW); Shih-Ta Hsiang, New Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 501 days.

(21) Appl. No.: 14/406,529

(22) PCT Filed: Jun. 13, 2013

(86) PCT No.: PCT/CN2013/077160
§ 371 (c)(1),
(2) Date: Dec. 8, 2014

(87) PCT Pub. No.: WO2013/189257
PCT Pub. Date: Dec. 27, 2013

(65) Prior Publication Data
US 2015/0139325 A1    May 21, 2015

Related U.S. Application Data

(60) Provisional application No. 61/661,834, filed on Jun. 20, 2012.

(51) Int. Cl.
*H04N 19/30* (2014.01)
*H04N 19/31* (2014.01)
(Continued)

(52) U.S. Cl.
CPC ............ *H04N 19/30* (2014.11); *H04N 19/31* (2014.11); *H04N 19/33* (2014.11); *H04N 19/50* (2014.11);
(Continued)

(58) Field of Classification Search
CPC .... H04N 19/587; H04N 19/59; H04N 19/593; H04N 19/31; H04N 19/33
See application file for complete search history.

(56) References Cited

U.S. PATENT DOCUMENTS

2004/0017949 A1* 1/2004 Lin ...................... H04N 19/587
382/232
2006/0262861 A1* 11/2006 Kobayashi ........... H04N 19/176
375/240.24
(Continued)

FOREIGN PATENT DOCUMENTS

CN    1728832(A)    2/2006
CN    101198064 A    6/2008
(Continued)

OTHER PUBLICATIONS

Xiu, X., et al.; "2. TE A2: Inter-layer Reference Picture Placement;" Joint Collaborative Team on Video Coding (JCT-VC) of ITU-T SG 16 WP 3 and ISO/IEC JTC 1/SC 29/WG 11; Jan. 2013; pp. 1-8.
(Continued)

*Primary Examiner* — David N Werner
(74) *Attorney, Agent, or Firm* — Oblon, McClelland, Maier & Neustadt, L.L.P.

(57) ABSTRACT

A method and apparatus for inter-layer prediction for scalable video coding are disclosed. Embodiments of the present invention utilize weighted prediction for scalable coding. The weighted prediction is based on the predicted texture data and the inter-layer Intra prediction data derived from BL reconstructed data. The inter-layer Intra prediction data
(Continued)

corresponds to the BL reconstructed data or up-sampled BL reconstructed data. The predicted texture data corresponds to spatial Intra prediction data or motion-compensated prediction data based on the second EL video data in the same layer as the current EL picture. Embodiments of the present invention also utilize the reference picture list including an inter-layer reference picture (ILRP) corresponding to BL reconstructed texture frame or up-sampled BL reconstructed texture frame for Inter prediction of EL video data. The motion vector is limited to a range around (0,0) when the ILRP is selected as a reference picture.

28 Claims, 4 Drawing Sheets

(51) Int. Cl.

| | | |
|---|---|---|
| *H04N 19/587* | (2014.01) | |
| *H04N 19/52* | (2014.01) | |
| *H04N 19/50* | (2014.01) | |
| *H04N 19/59* | (2014.01) | |
| *H04N 19/33* | (2014.01) | |
| *H04N 19/593* | (2014.01) | |
| *H04N 19/51* | (2014.01) | |
| *H04N 19/36* | (2014.01) | |

(52) U.S. Cl.
CPC ............ *H04N 19/51* (2014.11); *H04N 19/52* (2014.11); *H04N 19/587* (2014.11); *H04N 19/59* (2014.11); *H04N 19/593* (2014.11); *H04N 19/36* (2014.11)

(56) References Cited

U.S. PATENT DOCUMENTS

| | | | | |
|---|---|---|---|---|
| 2008/0043832 | A1* | 2/2008 | Barkley | H04N 21/234327 375/240 |
| 2008/0089411 | A1 | 4/2008 | Wenger et al. | |
| 2010/0278232 | A1* | 11/2010 | Yea | H04N 13/0022 375/240.08 |
| 2012/0293620 | A1* | 11/2012 | Pahalawatta | H04N 19/597 348/43 |
| 2014/0098886 | A1* | 4/2014 | Crenshaw | H04N 19/176 375/240.16 |

FOREIGN PATENT DOCUMENTS

| | | |
|---|---|---|
| CN | 102439976 A | 5/2012 |
| WO | WO 2006/044370 | 4/2006 |
| WO | 2010127692 A1 | 11/2010 |

OTHER PUBLICATIONS

Chinese Office Action dated Sep. 12, 2017 in Application No. 201380032664.X, 7 pages with English translation.

* cited by examiner ion 131, base layer entropy coding 141 and SNR enhance-
METHOD AND APPARATUS OF BI-DIRECTIONAL PREDICTION FOR SCALABLE VIDEO CODING

CROSS REFERENCE TO RELATED APPLICATIONS

The present invention claims priority to U.S. Provisional Patent Application Ser. No. 61/661,834, filed Jun. 20, 2012, entitled "Bi-directional Prediction in Scalable Video Coding Extension of High Efficiency Video Coding". The U.S. Provisional Patent Application is hereby incorporated by reference in its entirety.

TECHNICAL FIELD

The present invention relates to scalable video coding. In particular, the present invention relates to inter-layer prediction between layers for scalable video coding.

BACKGROUND

Compressed digital video has been widely used in various applications such as video streaming over digital networks and video transmission over digital channels. Very often, a single video content may be delivered over networks with different characteristics. For example, a live sport event may be carried in a high-bandwidth streaming format over broadband networks for premium video service. In such applications, the compressed video usually preserves high resolution and high quality so that the video content is suited for high-definition devices such as an HDTV or a high resolution LCD display. The same content may also be carried through cellular data network so that the content can be watch on a portable device such as a smart phone or a network-connected portable media device. In such applications, due to the network bandwidth concerns as well as the typical low-resolution display on the smart phone or portable devices, the video content usually is compressed into lower resolution and lower bitrates. Therefore, for different network environment and for different applications, the video resolution and video quality requirements are quite different. Even for the same type of network, users may experience different available bandwidths due to different network infrastructure and network traffic condition. Therefore, a user may desire to receive the video at higher quality when the available bandwidth is high and receive a lower-quality, but smooth, video when the network congestion occurs. In another scenario, a high-end media player can handle high-resolution and high bitrate compressed video while a low-cost media player is only capable of handling low-resolution and low bitrate compressed video due to limited computational resources. Accordingly, it is desirable to construct the compressed video in a scalable manner so that videos at different spatial-temporal resolution and/or quality can be derived from the same compressed bitstream.

The joint video team (JVT) of ISO/IEC MPEG and ITU-T VCEG standardized a Scalable Video Coding (SVC) extension of the H.264/AVC standard. An H.264/AVC SVC bitstream can contain video information from low frame-rate, low resolution, and low quality to high frame rate, high definition, and high quality. This single bitstream can be adapted to various applications and displayed on devices with different configurations. Accordingly, H.264/AVC SVC is suitable for various video applications such as video broadcasting, video streaming, and video surveillance to adapt to network infrastructure, traffic condition, user preference, and etc.

In SVC, three types of scalabilities, i.e., temporal scalability, spatial scalability, and quality scalability, are provided. SVC uses multi-layer coding structure to realize the three dimensions of scalability. A main goal of SVC is to generate one scalable bitstream that can be easily and rapidly adapted to the bit-rate requirement associated with various transmission channels, diverse display capabilities, and different computational resources without trans-coding or re-encoding. An important feature of the SVC design is that the scalability is provided at a bitstream level. In other words, bitstreams for deriving video with a reduced spatial and/or temporal resolution can be simply obtained by extracting Network Abstraction Layer (NAL) units (or network packets) from a scalable bitstream that are required for decoding the intended video. NAL units for quality refinement can be additionally truncated in order to reduce the bit-rate and the associated video quality.

In SVC, spatial scalability is supported based on the pyramid coding scheme as shown in FIG. 1. In a SVC system with spatial scalability, the video sequence is first down-sampled to obtain smaller pictures at different spatial resolutions (layers). For example, picture 110 at the original resolution can be processed by spatial decimation 120 to obtain resolution-reduced picture 111. The resolution-reduced picture 111 can be further processed by spatial decimation 121 to obtain further resolution-reduced picture 112 as shown in FIG. 1. In addition to dyadic spatial resolution, where the spatial resolution is reduced to half in each level, SVC also supports arbitrary resolution ratios, which is called extended spatial scalability (ESS). The SVC system in FIG. 1 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 112 is coded using motion-compensated and Intra prediction 130.

The motion-compensated and Intra prediction 130 will generate syntax elements as well as coding related information such as motion information for further entropy coding 140. FIG. 1 actually illustrates a combined SVC system that provides spatial scalability as well as quality scalability (also called SNR scalability). The system may also provide temporal scalability, which is not explicitly shown. For each single-layer coding, the residual coding errors can be refined using SNR enhancement layer coding 150. The SNR enhancement layer in FIG. 1 may provide multiple quality levels (quality scalability). Each supported resolution layer can be coded by respective single-layer motion-compensated and Intra prediction like a non-scalable coding system. Each higher spatial layer may also be coded using inter-layer coding based on one or more lower spatial layers. For example, layer 1 video can be adaptively coded using inter-layer prediction based on layer 0 video or a single-layer coding on a macroblock by macroblock basis or other block unit. Similarly, layer 2 video can be adaptively coded using inter-layer prediction based on reconstructed layer 1 video or a single-layer coding. As shown in FIG. 1, layer-1 pictures 111 can be coded by motion-compensated and Intra prediction 131, base layer entropy coding 141 and SNR enhancement layer coding 151. As shown in FIG. 1, the reconstructed BL video data is also utilized by motion-compensated and Intra prediction 131, where a coding block in spatial layer 1 may use the reconstructed BL video data as an additional Intra prediction data (i.e., no motion compensation is involved). Similarly, layer-2 pictures 110 can be coded by motion-compensated and Intra prediction 132, base layer entropy coding 142 and SNR enhancement layer coding 152. The BL bitstreams and SNR enhancement layer bitstreams from all spatial layers are multiplexed by multiplexer 160 to generate a scalable bitstream. The coding efficiency can be improved due to inter-layer coding. Furthermore, the information required to code spatial layer 1 may depend on reconstructed layer 0 (inter-layer prediction). A higher layer in an SVC system is referred as an enhancement layer. The H.264 SVC provides three types of inter-layer prediction tools: inter-layer motion prediction, inter-layer Intra prediction, and inter-layer residual prediction.

In SVC, the enhancement layer (EL) can reuse the motion information in the base layer (BL) to reduce the inter-layer motion data redundancy. For example, the EL macroblock coding may use a flag, such as base_mode_flag before mb_type is determined to indicate whether the EL motion information is directly derived from the BL. If base_mode_flag is equal to 1, the partitioning data of the EL macroblock along with the associated reference indexes and motion vectors are derived from the corresponding data of the collocated 8×8 block in the BL. The reference picture index of the BL is directly used in the EL. The motion vectors of the EL are scaled from the data associated with the BL. Besides, the scaled BL motion vector can be used as an additional motion vector predictor for the EL.

Inter-layer residual prediction uses the up-sampled BL residual information to reduce the information required for coding the EL residuals. The collocated residual of the BL can be block-wise up-sampled using a bilinear filter and can be used as prediction for the residual of a corresponding macroblock in the EL. The up-sampling of the reference layer residual is done on transform block basis in order to ensure that no filtering is applied across transform block boundaries.

Similar to inter-layer residual prediction, the inter-layer Intra prediction reduces the redundant texture information of the EL. The prediction in the EL is generated by block-wise up-sampling the collocated BL reconstruction signal. In the inter-layer Intra prediction up-sampling procedure, 4-tap and 2-tap FIR filters are applied for luma and chroma components, respectively. Different from inter-layer residual prediction, filtering for the inter-layer Intra prediction is always performed across sub-block boundaries. For decoding simplicity, inter-layer Intra prediction can be applied only to the Intra-coded macroblocks in the BL.

In HEVC Intra DC prediction, a 2-tap low-pass filter with coefficient set [1, 3] is applied to the first row and the first column of the block and a 2-tap low-pass filter with coefficient set [1, 2, 1] is applied to the top-left corner of the block, in order to reduce the block artifact. As shown in FIG. 2, the filtered D is equal to (A+2D+B+2)>>2, and the filtered E is equal to (C+3E+2)>>2. It is desirable to make more efficient use of the BL reconstructed video data to improve image quality and or coding efficiency for scalable video coding.

SUMMARY

A method and apparatus for inter-layer prediction for scalable video coding are disclosed. Embodiments of the present invention utilize weighted prediction for scalable coding. The weighted prediction is based on the predicted texture data for the EL picture derived from second EL video data in a same layer as the current EL picture and the inter-layer Intra prediction data derived from BL reconstructed data. The inter-layer Intra prediction data may correspond to the BL reconstructed data or up-sampled BL reconstructed data. The predicted texture data for the first EL video data may correspond to spatial Intra prediction data or motion-compensated prediction data based on the second EL video data in the same layer as the current EL picture. The weighted prediction data for the first EL video data corresponds to sum of the inter-layer Intra prediction data weighted by a first factor and the predicted texture data weighted by a second factor. Furthermore, different weight factors can be used for different pixels. In one embodiment, the weighted prediction data is generated only for boundary pixels of a block.

Embodiments of the present invention utilize the reference picture list including an inter-layer reference picture (ILRP) corresponding to BL texture frame or up-sampled BL reconstructed texture frame for Inter prediction of EL video data. The motion vector (MV) of a block is limited to a range around (0,0) when the ILRP is selected as the reference picture to generate the Inter prediction data. The MV can be further limited to be (0,0). In one embodiment, the horizontal MV and vertical MV may be limited to individual ranges around 0.

One aspect of the invention addresses utilizing BL reconstructed texture frame or up-sampled BL reconstructed texture frame as a reference frame for Inter prediction in a scalable video encoder. For Merge candidate determination, if the ILRP is selected as the reference picture and a candidate MV is not within the first range around (0, 0), the candidate MV cannot be selected by the video encoder. Furthermore, the range can be as small as a single data (0,0). For Inter mode, if the ILRP is selected as the reference picture and motion vector predict (MVP) for the MV of said block is equal to (0,0), motion vector difference (MVD) for the MV of said block is limited to (0, 0). In one embodiment, if the ILRP is selected as the reference picture and a decoded MV for said block is not within a range around (0, 0), the decoded MV is clipped to within a range around (0, 0). In another embodiment, if the ILRP is selected as the reference picture and a decoded MV for said block is not (0, 0), the decoded MV is set to (0, 0).

Another aspect of the invention addresses utilizing BL reconstructed texture frame or up-sampled BL reconstructed texture frame as a reference frame for Inter prediction in a scalable video decoder. In one embodiment, the parsing process, decoding process or a combination of the parsing process and the decoding process are modified to limit the MV within a range around (0,0) in the video decoder. In another embodiment, the parsing process, the decoding process or a combination of the parsing process and the decoding process are modified for motion vector predict (MVP) index, motion vector difference (MVD), or both of the MVP index and the MVD to limit the MV. In another embodiment, if the MVD is restricted to (0, 0), the parsing process for the MVD or MVP index is bypassed and the MVD is set to (0, 0).

DETAILED DESCRIPTION

Figure 1:
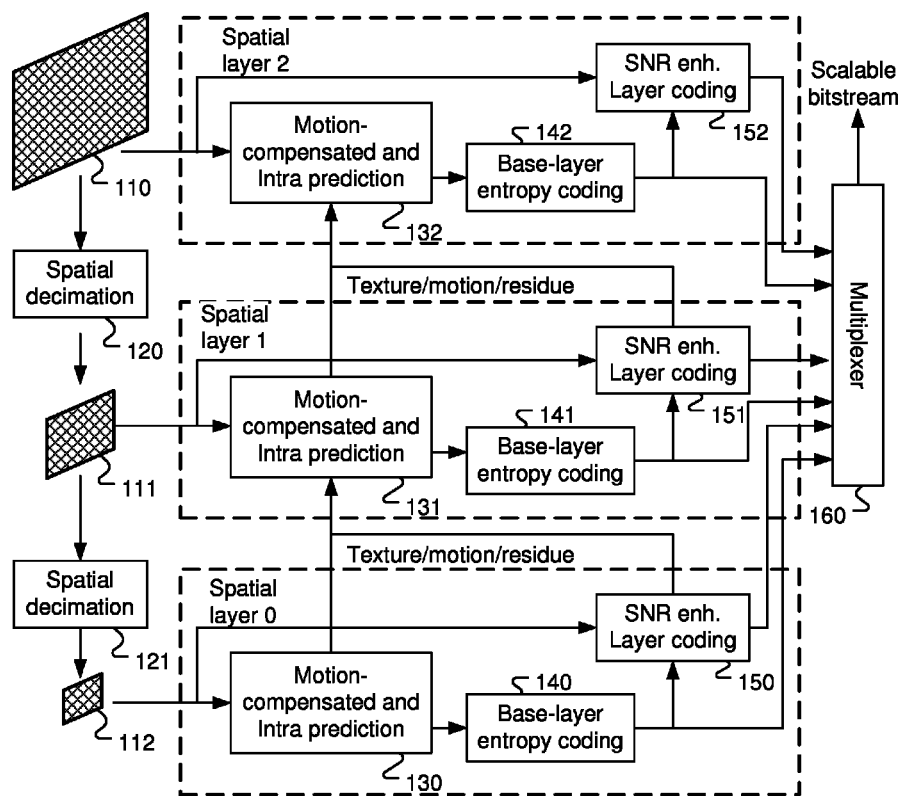
FIG. 1 illustrates an example of prediction structure for a scalable video coding system with three spatial layers.
Figure 2:
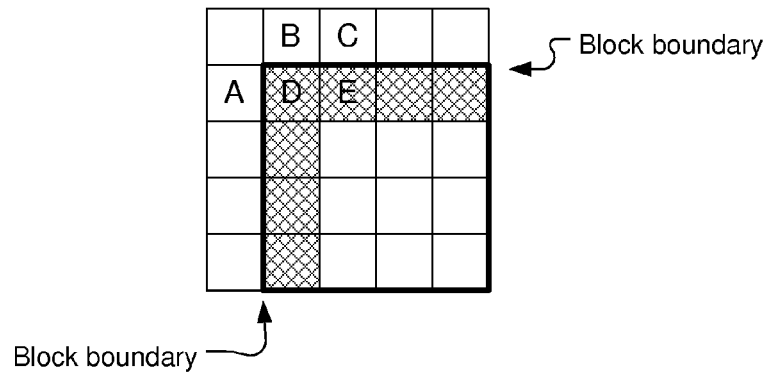
FIG. 2 illustrates an example of boundary pixel filtering of HEVC Intra DC prediction in order to reduce the block artifact across block boundaries.

Block boundary smoothing is disclosed for inter-layer Intra prediction according to an embodiment of the present invention. Similar to HEVC, boundary smoothing filter can be applied to the block boundary of inter-layer Intra predicted block, i.e., up-sampled BL reconstruction pixels. N boundary rows and M boundary columns of an inter-layer Intra predicted block are filtered by applying filtering to neighboring reconstructed pixels in the current layer, where N and M are integers. In FIG. 2, the filtered boundary pixels are shown as shaded boxes, where N and M correspond to 1. In other words, only one boundary row and one boundary column are filtered. Furthermore, the block processing order in FIG. 2 is assumed to be from left to right and from top to bottom. Therefore, the boundary rows on the top and boundary columns on the left are filtered for the current block. If the block processing order is changed, the boundary rows and/or boundary columns to be filtered for the current block may be changed accordingly. The filter can be a finite impulse response (FIR) filter, such as a filter with filter coefficient set [1, 1], [1, 2, 1], [1, 3], [1, 7], or [1, 6, 1]. The FIR filter can be applied to neighboring reconstructed pixels of the current layer before doing the boundary smoothing.

Figure 3:
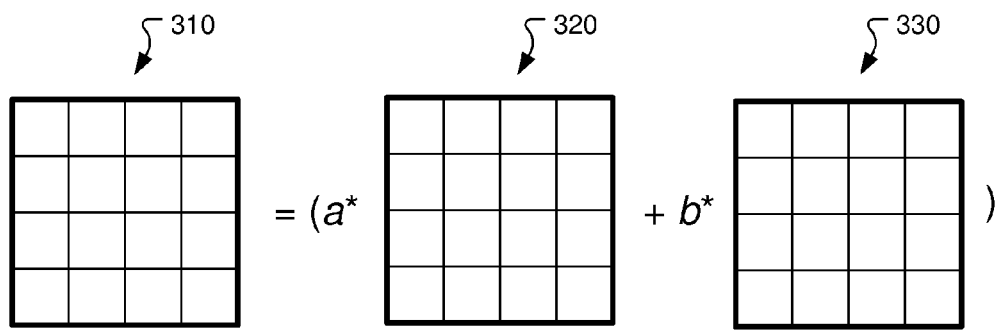
FIG. 3 illustrates an example of weighted prediction for scalable video coding incorporating an embodiment of the present invention, where the weighted prediction is based on predicted texture from the current layer and up-sampled BL video data.

In one embodiment of the present invention, bi-directional or weighted prediction is used for inter-layer prediction that combines the inter-layer Intra prediction (i.e., up-sampled BL reconstruction pixels) with the predicted texture from the current layer. The predictors of current block can be a weighted sum of the predicted texture from the current layer and the up-sampled BL reconstruction pixels as shown in FIG. 3, where weighting factors a and b are two real numbers. In FIG. 3, block 310 corresponds to the prediction data for a given block, block 320 corresponds to the predicted texture block from the current layer and block 330 corresponds to the up-sampled BL texture block. The predicted texture from the current layer can be spatial Intra prediction data of the current layer or motion compensated prediction data of the current layer. FIG. 3 illustrates an example of 4×4 block, other block sizes may also be used to practice the present invention. The block may be a largest coding unit (LCU), a coding unit (CU), a slice, a tile, or even a whole frame.

Figure 4:
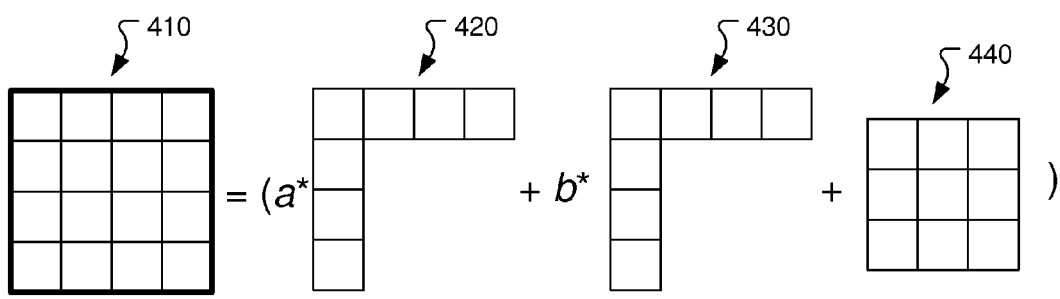
FIG. 4 illustrates an example of weighted prediction for scalable video coding incorporating an embodiment of the present invention, where the weighted prediction is applied to boundary pixels of predicted texture from the current layer and up-sampled BL video data.

The two weighting factors, a and b, can be position dependent. For example, the bi-directional or weighted prediction can be applied to the boundary pixels of current block only, as shown in FIG. 4, where the first row and the first column pixels of the inter-layer Intra predicted block and the predicted texture from current layer are filtered. In FIG. 4, block 410 corresponds to the prediction data for a given block, block 420 corresponds to boundary pixels of the predicted texture block from the current layer, block 430 corresponds to boundary pixels of the up-sampled BL texture block, and block 440 corresponds to non-boundary pixels of the up-sampled BL texture block. The predicted texture from current layer corresponds to the spatial Intra prediction of the current layer or the motion compensated prediction of the current layer. While one boundary row and one boundary column are weighted to form prediction data, more than one boundary row and/or more than one boundary column may be used for weighted prediction.

The BL texture frame or the up-sampled BL texture frame can be used as one of the reference frames for Inter prediction in the current layer. In this case, the BL texture frame or the up-sampled BL texture frame is called inter-layer reference picture (ILRP). The ILRP can be included in the reference frame list. If the ILRP is selected as the reference frame (e.g. the reference frame index points to the ILRP), the motion vector (MV) of a block can be restricted within a range around (0, 0). In other words, the MV is restricted to be within an area around (0,0), where the area can be a circle, a rectangle, or any arbitrary shape. In one example, the horizontal MV can be limited to a range from −N to +N, and the vertical MV can be limited to a range from −M to +M, where M and N are non-negative integers. N and M can be related to frame resolution ratio of the current layer to the BL. N and M can be 0 and in this case, the MV of the ILRP must be (0, 0). One way to restrict the MV within a range around (0, 0) is to set the MVP for the current block or Merge candidate for the current block to (0, 0) if the reference frame index points to the ILRP and to limit the MVD to a range around (0, 0). Another way to restrict the MV within a range around (0, 0) is to choose the MVP or Merge candidate for the current block to be (0, 0) if the reference frame index points to the ILRP and to limit the MVD to a range around (0, 0). The horizontal MVD is limited to a range from −N to +N, and the vertical MVD is limited to a range from −M to +M. The N and M can be related to frame resolution ratio of the current EL to the BL. The N and M can be 0 and in this case, the MVD must be (0, 0) if the reference frame index points to the ILRP. The weighted prediction can be applied if one of the reference frames is an ILRP, where the weighting is applied to Inter prediction derived from up-sampled BL reconstructed video data and another prediction data, such as predicted texture data from the current layer. The Inter prediction on the ILRP can be applied when the BL video data is Intra coded.

The MV restriction on the ILRP can be applied in encoder side as a normative encoder constraint, or can be applied in the decoder side as a normative change (e.g. change the parsing process and decoding process). For the encoder side constraint, the encoder incorporating an embodiment of the present invention will generate a bitstream corresponding to the compressed data, where the MV is restricted within a range around (0, 0), or equal to (0, 0) if the reference frame index points to the ILRP. For a Merge candidate, if the reference frame index points to the ILRP and the MV is not restricted within a range around (0, 0) or equal to (0,0), this Merge candidate cannot be selected by the encoder. For example, for a Merge candidate, if the reference frame index points to the ILRP and a candidate MV is not (0, 0), this Merge candidate cannot be selected. For Inter mode, if the reference frame index points to the ILRP and the MVP is equal to (0, 0), the MVD must be limit to a range around (0, 0) or equal to (0, 0). When the MV restriction on the ILRP is applied on the encoder side, if the reference frame index points to the ILRP, the MV can be clipped to a range around (0, 0) even when the received and decoded MV is not within the range. For example, the decoded MV can be set to (0, 0) even when the decoded MV is not (0, 0).

The MV restriction on the ILRP can be applied in decoder side along with modifications in the parsing process and/or decoding process. If the reference frame index points to the ILRP, the MV is limited to a range around (0, 0) or equal to (0, 0). For a Merge candidate, if the reference frame index points to the ILRP, the MV is limited to a range around (0, 0) or equal to (0, 0). For Inter mode, if the reference frame index point to the ILRP, the MVP is set to (0, 0) and the MVD is limited to a range around (0, 0). The code word and parsing process of MVP index and/or MVD can be modified in order to limit the MV within the range. For example, if the MVP and MVD are restricted to (0, 0), the parsing of MVD and MVP can be bypassed, and the MVD and MVP are set to (0, 0).

Another aspect of the present invention addresses inter-layer Intra prediction with refinement. For a CU, if the inter-layer Intra prediction is selected, a refinement value can be transmitted. The inter-layer Intra prediction is similar to the Inter prediction based on the up-sampled BL texture frame. If the refinement value is equal to 0, the corresponding up-sampled BL texture is used. If the value is not equal to 0, an interpolation filter, such as DCTIF (discrete cosine transform interpolation filter) is applied and the fractional pixels of the up-sampled BL texture are used as the predictor.

In another embodiment of the present invention, adaptive filter is applied to the BL texture to form inter-layer Intra prediction. The adaptive filter is similar to the adaptive loop filter (ALF) and sample adaptive offset (SAO) in HEVC. However, the adaptive filter is applied on different source pixels for inter-layer Intra prediction. The filter parameters can be signaled in bitstream. The filter parameters can be transmitted only if the inter-layer Intra prediction is used in a current prediction unit (PU), coding unit (CU), or largest coding unit (LCU). For example, in an LCU, if a CU uses the BL texture as predictor and the CU is the first CU that uses the BL texture as predictor in the current LCU, the adaptive filter parameters are transmitted. Otherwise, the adaptive filter parameters will not be transmitted.

Another aspect of the present invention addresses inter-layer residual prediction for Intra prediction and inter-layer Intra prediction. In H.264/SVC, the inter-layer residual prediction can only be applied to Inter-coded macroblocks (MBs). However, according to an embodiment of the present invention, the inter-layer residual prediction can also be applied to a block when the block is coded in Intra prediction or inter-layer Intra prediction. In other words, the inter-layer prediction technique is applied to residues generated by Intra prediction or inter-layer Intra prediction.

Figure 5:
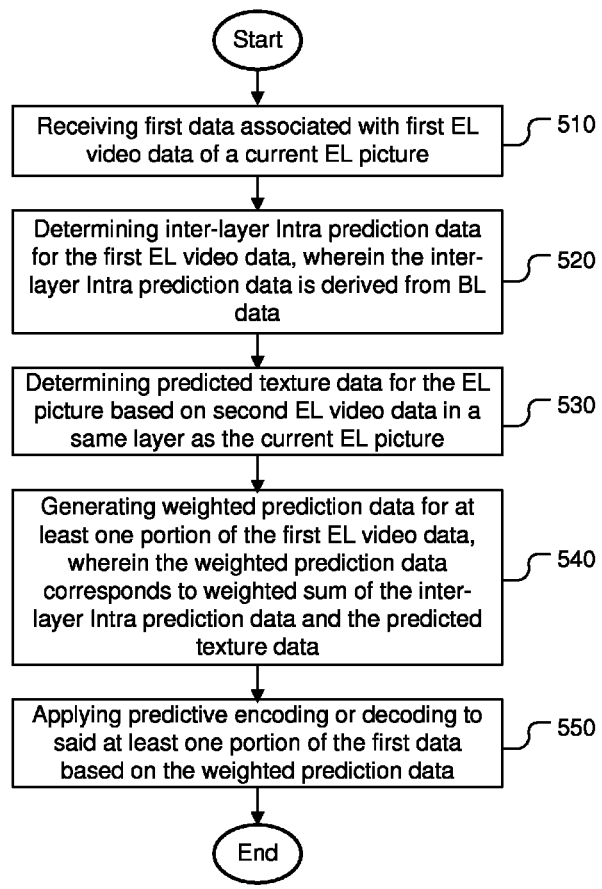
FIG. 5 illustrates an exemplary flowchart for a scalable video coding system incorporating weighted prediction according to an embodiment of the present invention.

FIG. 5 illustrates an exemplary flowchart for a scalable video coding system incorporating weighted prediction according to an embodiment of the present invention. The video data is configured into a Base Layer (BL) and an Enhancement Layer (EL) and wherein EL video data has higher spatial resolution or better video quality than BL video data. The system receives first data associated with first EL video data of a current EL picture 510. For encoding, the first data corresponds to the EL video data to be coded. For decoding, the first data corresponds to prediction residue of the EL video data and, the predictive decoding is applied to the prediction residue to recover the EL video data. The first data may be retrieved from storage such as a computer memory, buffer (RAM or DRAM) or other media. The first data may also be received from a processor such as a controller, a central processing unit, a digital signal processor or electronic circuits that produce the first data. The inter-layer Intra prediction data for the first EL video data is determined in step 520, wherein the inter-layer Intra prediction data is derived from BL reconstructed data. The predicted texture data for the EL picture is determined based on second EL video data in a same layer as the current EL picture as shown in step 530. The weighted prediction data is determined for at least one portion of the first EL video data as shown in step 540, wherein the weighted prediction data corresponds to weighted sum of the inter-layer Intra prediction data and the predicted texture data. Predictive encoding is then applied to said at least one portion of the first data based on the weighted prediction data to generate prediction residues for further encoding process as shown in step 550. For decoding, predictive decoding is applied to said at least one portion of the first data based on the weighted prediction data to recover the first EL video data as shown in step 550.

Figure 6:
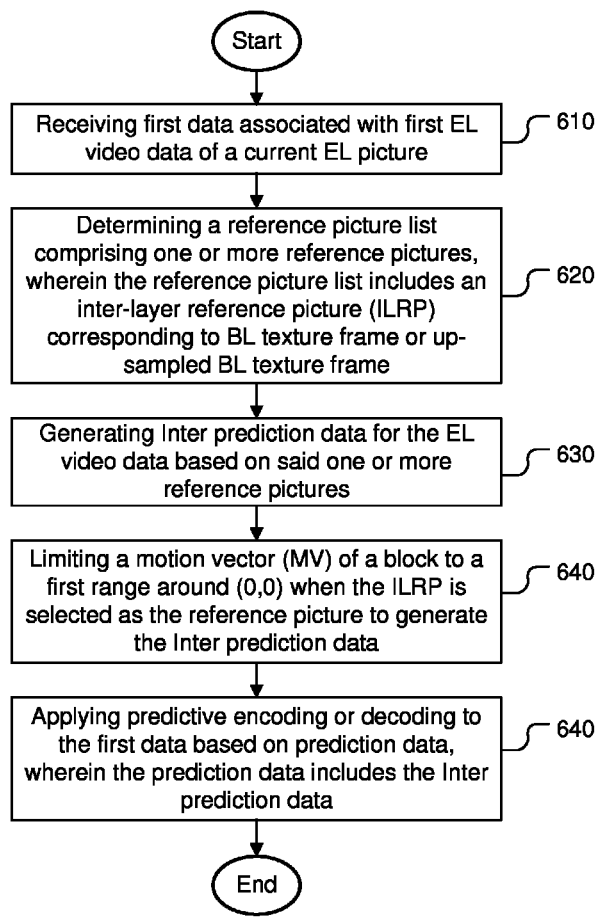
FIG. 6 illustrates an exemplary flowchart for a scalable video coding system incorporating an inter-layer reference picture (ILRP) as a reference picture according to an embodiment of the present invention.

FIG. 6 illustrates an exemplary flowchart for a scalable video coding system incorporating an inter-layer reference picture (ILRP) as a reference picture according to an embodiment of the present invention. Again, the video data is configured into a Base Layer (BL) and an Enhancement Layer (EL) and wherein EL video data has higher spatial resolution or better video quality than BL video data. The first data associated with first EL video data of a current EL picture is received in step 610. For encoding, the first data corresponds to the EL video data to be coded. For decoding, the first data corresponds to prediction residue of the EL video data and, the predictive decoding is applied to the prediction residue to recover the EL video data. The first data may be retrieved from storage such as a computer memory, buffer (RAM or DRAM) or other media. The first data may also be received from a processor such as a controller, a central processing unit, a digital signal processor or electronic circuits that produce the first data. A reference picture list comprising one or more reference pictures is determined in step 620, wherein the reference picture list includes an inter-layer reference picture (ILRP) corresponding to BL reconstructed texture frame or up-sampled BL reconstructed texture frame. Inter prediction data for the EL video data is generated based on said one or more reference pictures. Predictive encoding or decoding is then applied to the first data based on prediction data, wherein the prediction data includes the Inter prediction data as shown in step 640. The motion vector is limited to a range around (0,0) or is set to (0,0) when the ILRP is selected as a reference picture.

The flowcharts shown above are intended to illustrate an example of weighted prediction for scalable coding and using BL video data or up-sampled BL video data as a reference frame for Inter prediction. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of inter-layer prediction for scalable video coding, wherein video data is configured into a Base Layer (BL) and an Enhancement Layer (EL) and wherein EL video data has higher spatial resolution or better quality than BL video data, the method comprising:
   receiving first data associated with a current EL block of a current EL picture;
   generating inter-layer Intra prediction data for the current EL block based on a BL picture;
   generating predicted texture data for the current EL block based on a reference EL block in a same layer as the current EL picture;
   generating weighted prediction data for the current EL block, wherein the weighted prediction data is generated using a weighted sum of the inter-layer Infra prediction data and the predicted texture data for a first portion of the current EL block and using only the inter-layer Intra prediction data for a second portion of the current EL block; and
   encoding the current EL picture or decoding an encoded version of the current EL picture based on the weighted prediction data.

2. The method of claim 1, wherein
   the BL picture is a reconstructed BL frame, and
   the generating the inter-layer Intra prediction data is performed based on the BL reconstructed frame or an up-sampled BL reconstructed frame.

3. The method of claim 1, wherein the predicted texture data for the current EL block correspond to spatial Intra prediction data or motion-compensated prediction data based on the reference EL block in the same layer as the current EL picture.

4. The method of claim 1, wherein the weighted sum for the first portion of the current EL block corresponds to a sum of the inter-layer Infra prediction data weighted by a first factor and the predicted texture data weighted by a second factor, wherein the first factor and the second factor are real-valued data.

5. The method of claim 4, wherein a first pixel and a second pixel in the first portion of the current EL block have different first factors, different second factors, or different first factors and second factors to generate the weighted prediction data.

6. The method of claim 1, wherein the current EL block corresponds to a block of pixels and the first portion of the current EL block corresponds to pixels located within a predetermined number of pixels from at least one boundary of the block of pixels.

7. The method of claim 6, wherein the first portion of the current EL block corresponds to N neighboring rows of the pixels adjacent to a first boundary and M neighboring columns of the pixels adjacent to a second boundary of the block of pixels, where N and M are non-negative integers.

8. The method of claim 7, wherein a first row and a second row of the N neighboring rows use different weighting factors to derive the weighted sum, or a first column and a second column of the M neighboring columns use different weighting factors to derive the weighted prediction data.

9. A method of inter-layer prediction for scalable video coding, wherein video data is configured into a Base Layer (BL) and an Enhancement Layer (EL) and wherein EL video data has higher spatial resolution or better quality than BL video data, the method comprising:
   receiving first data associated with a current EL block of a current EL picture;
   determining a reference picture list comprising one or more reference pictures for a Merge mode, wherein the reference picture list includes an inter-layer reference picture (ILRP) corresponding to a BL texture frame or an up-sampled BL texture frame;
   limiting a candidate motion vector (MV) associated with a merge candidate picture selected from the reference picture list to a first range of (0, 0) when the merge candidate picture is the ILRP, and not limiting the candidate MV associated with the merge candidate picture when the merge candidate picture is not the ILRP;
   when the candidate MV is selected for the current EL block, generating Inter prediction data for the current EL block based on the candidate MV; and
   encoding the current EL picture or decoding an encoded version of the current EL picture based on the inter prediction data.

10. The method of claim 9, wherein the candidate MV associated with the merge candidate picture is limited to (0.0) when the merge candidate picture is the ILRP.

11. The method of claim 9, wherein, when the merge candidate picture is the ILRP, horizontal MV associated with the merge candidate picture is restricted to a second range from −N to +N, vertical MV associated with the merge candidate picture is restricted to a third range from −M to +M, or the horizontal MV is restricted to the second range and the vertical MV is restricted to the third range, wherein N and M are non-negative integers.

12. The method of claim 11, wherein N, M, or both N and M are related to a frame resolution ratio of the EL to the BL.

13. The method of claim 9, wherein the limiting the candidate MV associated with the merge candidate picture to the first range of (0,0) when the merge candidate picture is the ILRP is performed in a video encoder.

14. The method of claim 13, wherein a bitstream is generated for the current EL picture, wherein the bitstream includes compressed data associated with the candidate MV when the merge candidate picture is the ILRP.

15. The method of claim 14, wherein, when the merge candidate picture is the ILRP, horizontal MV associated with the merge candidate picture is restricted to a second range from −N to +N, vertical MV associated with the merge candidate picture is restricted to a third range from −M to +M, or the horizontal MV is restricted to the second range and the vertical MV is restricted to the third range, where N and M are non-negative integers.

16. The method of claim 13, wherein, for Merge candidate determination, if the merge candidate picture is the ILRP and another candidate MV of the merge candidate picture is not within the first range of (0, 0), the another candidate MV is not selected by the video encoder.

17. The method of claim 13, wherein the candidate MV associated with the merge candidate picture is limited to (0,0) when the merge candidate picture is the ILRP.

18. The method of claim 17, wherein for Merge candidate determination, if the merge candidate picture is the ILRP and another candidate MV is not (0, 0), the another candidate MV is not selected by the video encoder.

19. The method of claim 13, if the merge candidate picture is the ILRP and a decoded MV for the current EL block is not within the first range of (0, 0), the decoded MV is clipped to within the first range of (0, 0).

20. The method of claim 13, if the merge candidate picture is the ILRP and a decoded MV for the current EL block is not (0, 0), the decoded MV is set to (0, 0).

21. The method of claim 9, wherein
the limiting the candidate MV associated with the merge candidate picture to the first range of (0,0) when the merge candidate picture is the ILRP is performed in a video decoder.

22. The method of claim 21, wherein the limiting the candidate MV associated with the merge candidate picture when the merge candidate picture is the ILRP is performed by a parsing process, a decoding process, or a combination of the parsing process and the decoding process in the video decoder.

23. The method of claim 21, wherein, when the merge candidate picture is the ILRP, horizontal MV associated with the merge candidate picture is restricted to a second range from −N to +N, vertical MV associated with the merge candidate picture is restricted to a third range from −M to +M, or the horizontal MV is restricted to the second range and the vertical MV is restricted to the third range, where N and M are non-negative integers.

24. The method of claim 21, wherein the candidate MV of the merge candidate picture is set to (0,0) when the merge candidate picture is the ILRP.

25. The method of claim 9, wherein the encoding the current EL picture or the decoding the encoded version of the current EL picture is performed based on prediction data that correspond to a weighted sum of the Inter prediction data and another prediction data when the merge candidate picture is the ILRP for generating the Inter prediction data.

26. The method of claim 9, wherein the ILRP is selected as the merge candidate picture to generate the Inter prediction data when the BL texture frame associated with the current EL picture is Intra-coded.

27. An apparatus of inter-layer prediction for a scalable video coding system, wherein video data is configured into a Base Layer (BL) and an Enhancement Layer (EL) and wherein EL video data has higher spatial resolution or better quality than BL video data, the apparatus comprising:
processing circuitry configured to:
receive first data associated with a current EL block of a current EL picture;
generate inter-layer Intra prediction data for the current EL block based on a BL picture;
generate predicted texture data for the current EL block based on a reference EL block in a same layer as the current EL picture;
generate weighted prediction data for the current EL block, wherein the weighted prediction data is generated using a weighted sum of the inter-layer Intra prediction data and the predicted texture data for a first portion of the current EL block and using only the inter-layer Intra prediction data for a second portion of the current EL block; and
encode the current EL picture or decode an encoded version of the current EL picture based on the weighted prediction data.

28. An apparatus of inter-layer prediction for a scalable video coding system, wherein video data is configured into a Base Layer (BL) and an Enhancement Layer (EL) and wherein EL video data has higher spatial resolution or better quality than BL video data, the apparatus comprising:
processing circuitry configured to:
receive first data associated with a current EL block of a current EL picture;
determine a reference picture list comprising one or more reference pictures for a Merge mode, wherein the reference picture list includes an inter-layer reference picture (ILRP) corresponding to a BL texture frame or an up-sampled BL texture frame;
limit a candidate motion vector (MV) associated with a merge candidate picture selected from the reference picture list to a first range of (0, 0) when the merge candidate picture is the ILRP, and not limit the candidate MV associated with the merge candidate picture when the merge candidate picture is not the ILRP;
when the candidate MV is selected for the current EL block, generate Inter prediction data for the current EL block based on the candidate MV; and
encode the current EL picture or decode an encoded version of the current EL picture based on the Inter prediction data.

* * * * *